United States Patent
Hirata

(10) Patent No.: US 12,202,916 B2
(45) Date of Patent: Jan. 21, 2025

(54) METHOD FOR PRODUCING HOLLOW RESIN PARTICLES

(71) Applicant: ZEON CORPORATION, Tokyo (JP)

(72) Inventor: Takeshi Hirata, Tokyo (JP)

(73) Assignee: ZEON CORPORATION, Tokyo (JP)

(*) Notice: Subject to any disclaimer, the term of this patent is extended or adjusted under 35 U.S.C. 154(b) by 640 days.

(21) Appl. No.: 17/619,453

(22) PCT Filed: Jun. 4, 2020

(86) PCT No.: PCT/JP2020/022179
§ 371 (c)(1),
(2) Date: Dec. 15, 2021

(87) PCT Pub. No.: WO2020/261926
PCT Pub. Date: Dec. 30, 2020

(65) Prior Publication Data
US 2022/0251247 A1    Aug. 11, 2022

(30) Foreign Application Priority Data

Jun. 27, 2019 (JP) .................................. 2019-120028

(51) Int. Cl.
*C08F 2/18*     (2006.01)
*C08F 6/10*     (2006.01)
(Continued)

(52) U.S. Cl.
CPC ............... *C08F 2/18* (2013.01); *C08F 6/10* (2013.01); *C08F 220/06* (2013.01);
(Continued)

(58) Field of Classification Search
CPC ............ C08F 2/18; C08F 6/10; C08F 220/06; C08F 222/102; C08F 222/103; C08L 33/10; C08L 2205/20
See application file for complete search history.

(56) References Cited

U.S. PATENT DOCUMENTS

2007/0251422 A1* 11/2007 Maenaka ............... C09D 7/70
                                                           524/1
2019/0194415 A1*  6/2019 Tayagaki ............... B01J 13/18

FOREIGN PATENT DOCUMENTS

JP    2002-080503 A    3/2002
JP    2010-123348 A    6/2010
(Continued)

OTHER PUBLICATIONS

Notification of Transmittal of Translation of the International Preliminary Report on Patentability (Form PCT/IB/338) issued in counterpart International Application No. PCT/JP2020/022179 mailed Jan. 6, 2022 with Forms PCT/IB/373 and PCT/ISA/237. (5 pages).

(Continued)

*Primary Examiner* — Doris L Lee
(74) *Attorney, Agent, or Firm* — WHDA, LLP

(57) ABSTRACT

A method for producing hollow resin particles, the method comprising a mixture liquid preparation step, a suspension preparation step, a polymerization step, and a solvent removal step; wherein a content of a saturated hydrocarbon solvent is 50% by mass or more with respect to 100% by mass of a total amount of a hydrocarbon solvent; wherein a polymerization initiator is an oil-soluble polymerization initiator; and wherein, in the mixture liquid, a crosslinkable monomer contains a tri- or higher functional crosslinkable monomer, and with respect to 100 parts by mass of a total amount of the polymerizable monomer, a total content of the crosslinkable monomer is 80 to 98 parts by mass, a content of the tri- or higher functional crosslinkable monomer is from 10 parts by mass to 98 parts by mass, and a content of the hydrocarbon solvent is from 300 parts by mass to 1500 parts by mass.

5 Claims, 3 Drawing Sheets

(51) Int. Cl.
*C08F 220/06* (2006.01)
*C08F 222/10* (2006.01)
*C08L 33/10* (2006.01)

(52) U.S. Cl.
CPC ...... *C08F 222/102* (2020.02); *C08F 222/103* (2020.02); *C08L 33/10* (2013.01); *C08L 2205/20* (2013.01)

(56) References Cited

FOREIGN PATENT DOCUMENTS

| | | | |
|---|---|---|---|
| JP | 2013-221070 | A | 10/2013 |
| JP | 2016-190980 | A | 11/2016 |

OTHER PUBLICATIONS

Extended European Search Report dated Jun. 26, 2023, issued in counterpart EP Application No. 20830855.1. (7 pages).

\* cited by examiner

METHOD FOR PRODUCING HOLLOW RESIN PARTICLES

TECHNICAL FIELD

The present disclosure relates to a method for producing hollow resin particles. More particularly, the present disclosure relates to a method for producing hollow resin particles, which is capable of suppressing a decrease in void ratio of the obtained hollow resin particles, reducing a residual amount of a sparingly water-soluble solvent, and further suppressing the generation of porous particles.

BACKGROUND ART

Since the hollow resin particles can scatter light well and reduce the transmittance of light as compared with resin particles substantially filled with resin inside, they are commonly used in applications such as an aqueous coating material and a paper coating composition as an organic pigment or a concealing agent excellent in optical properties such as opacity and whiteness.

Incidentally, in an application such as an aqueous coating material or a paper coating composition, it is desired to increase the void ratio of the hollow resin particles to be blended in order to improve the effect of weight reduction, heat insulation, opacification and the like of a coating material, a paper coating composition and the like. However, it has been difficult to stably produce hollow resin particles having high void ratio while satisfying manufacturing conditions such that desired physical properties can be obtained.

For example, Patent Literature 1 discloses a method for producing hollow polymer fine particles used in a coating material, a paper coating composition or the like, wherein a mixture of a mixture of a crosslinkable monomer and a monofunctional monomer, an initiator, and a solvent poorly soluble in water having low compatibility with a copolymer of the crosslinkable monomer and the monofunctional monomer, is dispersed in an aqueous solution of a dispersion stabilizer, and subjected to suspension polymerization, as a method whereby the shell of the particle has a single layer structure and the particle has a high void ratio. In Example of Patent Literature 1, a monomer having two polymerizable functional groups is used as the crosslinkable monomer, and the ratio of the crosslinkable monomer is set to 59.2% by weight based on the total amount of the crosslinkable monomer and the monofunctional monomer.

On the other hand, Patent Literature 2 discloses a method for producing hollow resin particles available as microcapsules, wherein a mixed solution containing a polyfunctional monomer, a non-reactive solvent and a water-soluble polymerization initiator is dispersed in an aqueous solution, and then the polyfunctional monomer is polymerized, as a method whereby hollow resin particles which have a high void ratio and have fine through-holes through which the shell leads to the hollow are obtained. In the method of Patent Literature 2, by using a water-soluble polymerization initiator such as potassium persulfate as a polymerization initiator, fine through-holes tend to occur in the shell.

CITATION LIST

Patent Literature

[Patent Literature 1] Japanese Patent Application Laid-Open (JP-A) No. 2002-80503
[Patent Literature 2] JP-A No. 2016-190980

SUMMARY OF INVENTION

Technical Problem

However, in the method described in Patent Literature 1, it is difficult to remove a sparingly water-soluble solvent which satisfies the hollow interior of particles obtained after suspension polymerization, and as shown in Comparative Example 4 described later, there is a problem that a sparingly water-soluble solvent tends to remain in the hollow resin particles, and that the particle strength of the obtained hollow resin particles is insufficient and the particles tend to collapse easily.

In the process described in Patent Literature 2, the particle size of the obtained hollow resin particles tends to be small. Specifically, it is difficult to obtain hollow resin particles having a particle diameter of 1 μm or more, and as shown in Comparative Example 7 described later, there is a problem that dense real particles having a smaller particle diameter as compared with hollow resin particles and filled with a resin inside are easily generated.

In addition, it is desirable that only one hollow portion of the hollow resin particle is included in order to have excellent heat insulating properties and to have a good balance between a high void ratio and mechanical strength. However, in the conventional method, there is also a problem that porous particles having a plurality of hollow portions are manufactured together with the hollow resin particles having only one hollow portion.

An object of the present disclosure is to provide a method for producing hollow resin particles, which is capable of suppressing a decrease in void ratio and a decrease in particle diameter of the obtained hollow resin particles, reducing a residual amount of a sparingly water-soluble solvent in the hollow resin particles, and obtaining a hollow resin particle which is hardly collapsed, and further capable of suppressing generation of dense real particles and porous particles.

Solution to Problem

In the method for obtaining hollow resin particles by suspension polymerization, the present inventors have focused on the importance of the type of polymerization initiator in the mixture liquid used for suspension polymerization, the balance of the composition of the polymerizable monomer and the hydrocarbon solvent in the mixture liquid, and the type of the hydrocarbon solvent in order to obtain hollow resin particles having the desired void ratio and particle diameter, and hardly collapsed, and to reduce the residual amount of the sparingly water-soluble solvent in the particles, and to suppress the formation of the dense real particles and the porous particles in the process of producing the hollow resin particles.

The present disclosure provides a method for producing hollow resin particles, the method comprising:
a mixture liquid preparation step comprising preparing a mixture liquid which contains a polymerizable monomer containing a non-crosslinkable monomer and a crosslinkable monomer, a hydrocarbon solvent, a polymerization initiator and an aqueous medium,
a suspension preparation step comprising, by suspending the mixture liquid, preparing a suspension in which polymerizable monomer droplets including the hydrocarbon solvent are dispersed in the aqueous medium, a polymerization step comprising, by a polymerization reaction of the suspension, preparing a precursor composition containing a precursor particle having a hollow portion in which the hydrocarbon solvent is included, and a solvent removal step comprising removing the hydrocarbon solvent included in the precursor particle;

wherein a content of the saturated hydrocarbon solvent is 50% by mass or more, with respect to 100% by mass of a total amount of the hydrocarbon solvent;

wherein the polymerization initiator is an oil-soluble polymerization initiator; and wherein the crosslinkable monomer contains a tri- or higher functional crosslinkable monomer having three or more polymerizable functional groups, and with respect to 100 parts by mass of a total amount of the polymerizable monomer in the mixture liquid, a total content of the crosslinkable monomer is from 80 parts by mass to 98 parts by mass, a content of the tri- or higher functional crosslinkable monomer is from 10 parts by mass to 98 parts by mass, and a content of the hydrocarbon solvent is from 300 parts by mass to 1500 parts by mass.

In the method of the present disclosure, a volume average particle diameter of the hollow resin particles may be from 1 μm to 20 μm.

In the method of the present disclosure, it is preferable that the polymerizable monomer in the mixture liquid contains from 1 part by mass to 10 parts by mass of a carboxyl group-containing monomer, with respect to 100 parts by mass of a total amount of the polymerizable monomer.

In the method of the present disclosure, it is preferable that the hydrocarbon solvent has 4 to 7 carbon atoms.

In the method of the present disclosure, it is preferable that the solvent removal step is a step comprising removing the hydrocarbon solvent included in the precursor particle in the precursor composition by bubbling an inert gas into the precursor composition at a temperature higher than or equal to a temperature subtracted from the boiling point of the hydrocarbon solvent by 35° C.

Advantageous Effects of Invention

According to the production method of the present disclosure as described above, it is possible to suppress the decrease in the void ratio and the decrease in the particle diameter of the obtained hollow resin particles, to reduce the residual amount of the sparingly water-soluble solvent in the hollow resin particles, and to obtain the hollow resin particles which are hardly collapsed, and further, it is possible to suppress the generation of dense real particles and porous particles in the process of producing the hollow resin particles.

BRIEF DESCRIPTION OF DRAWINGS

In the accompanying drawings.

DESCRIPTION OF EMBODIMENTS

Figure 1:
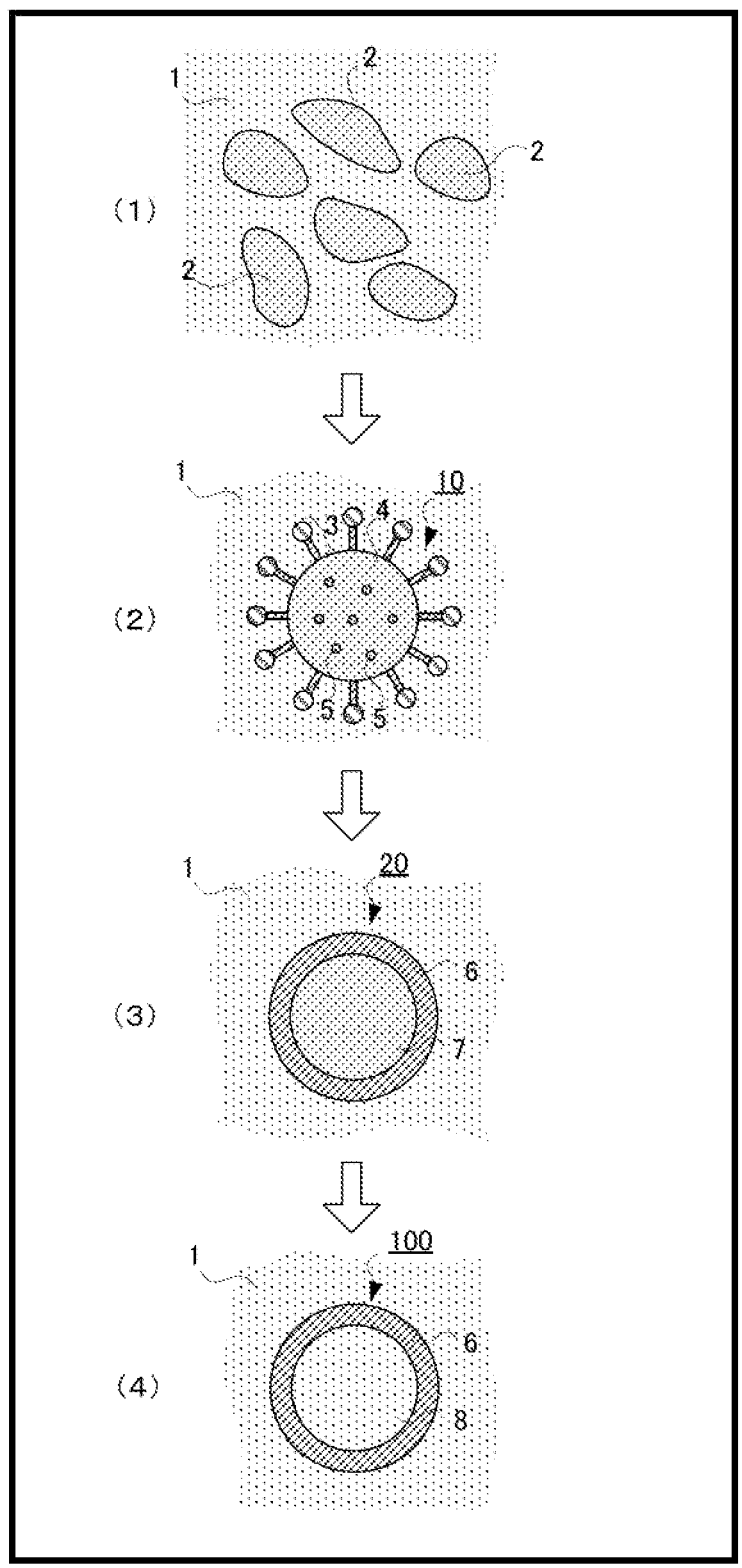
FIG. 1 is a schematic diagram showing an embodiment of the production method of the present disclosure.

The hollow resin particles obtained by the production method of the present disclosure are particles having a shell (outer shell) containing a resin, and a hollow portion surrounded by the shell. Here, the hollow portion is a region inside the particle surrounded by the shell, and has a single cavity shape.

In addition, in the hollow resin particles, the shell may not have a communication hole, and the hollow portion may be separated from the outside of the particles by the shell, or the shell may have one or two or more communication holes, and the hollow portion may be connected to the outside of the particles via the communication hole. When the shell has a communication hole, the hollow portion is a region inside the particle surrounded by the shell which is assumed to have closed the communication hole.

The hollow portion of the hollow resin particle can be confirmed by, for example, a general observation method such as SEM observation or TEM observation of the particle cross section.

Further, the hollow portion possessed by the hollow resin particles may be filled with a gas such as air or may contain a solvent. However, in the present disclosure, a resin particle having a hollow portion including a hydrocarbon solvent obtained in a polymerization step is referred to as a precursor particle as an intermediate of hollow resin particles obtained by the production method of the present disclosure.

A method for producing hollow resin particles in the present disclosure includes:

a mixture liquid preparation step comprising preparing a mixture liquid which contains a polymerizable monomer containing a non-crosslinkable monomer and a crosslinkable monomer, a hydrocarbon solvent, a polymerization initiator and an aqueous medium, a suspension preparation step comprising, by suspending the mixture liquid, preparing a suspension in which polymerizable monomer droplets including the hydrocarbon solvent are dispersed in the aqueous medium, a polymerization step comprising, by a polymerization reaction of the suspension, preparing a precursor composition containing a precursor particle having a hollow portion in which the hydrocarbon solvent is included, and a solvent removal step comprising removing the hydrocarbon solvent included in the precursor particle;

wherein a content of the saturated hydrocarbon solvent is 50% by mass or more, with respect to 100% by mass of a total amount of the hydrocarbon solvent;

wherein the polymerization initiator is an oil-soluble polymerization initiator; and wherein the crosslinkable monomer contains a tri- or higher functional crosslinkable monomer having three or more polymerizable functional groups, and with respect to 100 parts by mass of a total amount of the polymerizable monomer in the mixture liquid, a total content of the crosslinkable monomer is from 80 parts by mass to 98 parts by mass, a content of the tri- or higher functional crosslinkable monomer is from 10 parts by mass to 98 parts by mass, and a content of the hydrocarbon solvent is from 300 parts by mass to 1500 parts by mass.

According to the method for producing hollow resin particles of the present disclosure, since the mixture liquid used for suspension polymerization contains an oil-soluble polymerization initiator as a polymerization initiator, the polymerization initiator easily enters into the polymerizable monomer droplet obtained by suspending the mixture liquid, so that the polymerization reaction of the polymerizable monomer droplet tends to proceed. Further, as a polymerizable monomer, a crosslinkable monomer containing a trior higher functional crosslinkable monomer is contained in the specific amount, and as a sparingly water-soluble solvent, a hydrocarbon solvent is contained in the specific amount, whereby the polymerization reaction proceeds sufficiently in a condition in which a polymerizable monomer liquid droplet includes an appropriate amount of a hydrocarbon solvent in the polymerization step. Here, in the production method of the present disclosure, since the hydrocarbon solvent contains a saturated hydrocarbon solvent at a ratio of 50% by mass or more, a shell of the resin is easily formed so as to be a one hollow portion per one particle. This is presumed to be because, due to the fact that the proportion of the saturated hydrocarbon solvent in the hydrocarbon solvent is 50% by mass or more, the difference in polarity between the hydrocarbon solvent and the specific polymerizable monomer becomes large, so that phase separation tends to be sufficiently occurred in the polymerizable monomer droplet. As described above, by the combination of the type of the polymerization initiator, the balance of the composition of the polymerizable monomer and the hydrocarbon solvent, and the type of the hydrocarbon solvent, it is considered that the shell of the precursor particles to be formed becomes a shell covering one hollow portion, and also has a communication hole at an appropriate ratio, and has a crosslinked structure excellent in mechanical strength and a thickness excellent in mechanical strength. In the production method of the present disclosure, since hollow resin particles are produced using such precursor particles as an intermediate, the obtained hollow resin particles have only one hollow portion, and a decrease in the void ratio and a decrease in the particle diameter are suppressed, so that they are hardly collapsed and are excellent in mechanical strength. In addition, in the production method of the present disclosure, since the shell of the precursor particles has a communication hole at an appropriate ratio, it is estimated that the hydrocarbon solvent included in the precursor particles is easily removed, and the residual amount of the sparingly water-soluble solvent in the obtained hollow resin particles can be reduced.

As in Patent Literature 1, in a method using only a bifunctional crosslinkable monomer and a non-crosslinkable monomer as a polymerizable monomer, it is considered that a communication hole is hardly formed in the shell of the precursor particles to be formed, so that a sparingly water-soluble solvent tends to remain in the hollow resin particles or the particle strength of the hollow resin particles becomes insufficient.

In a method using a water-soluble polymerization initiator as a polymerization initiator as in Patent Literature 2, it is considered that a dense real particle having a relatively small particle diameter tends to be generated because the amount of the polymerization initiator present in the polymerizable monomer droplet is small and a large amount of the polymerization initiator is present in the aqueous medium. Further, since the polymerization reaction in the polymerizable monomer droplet does not sufficiently proceed, it is considered that a large number of communication holes are formed in the shell of the precursor particles to be formed, and the strength of the shell tends to be insufficient. On the other hand, the production method of the present disclosure can suppress the generation of dense real particles, and as described above, it can reduce the residual amount of the sparingly water-soluble solvent in the particles, and it is possible to obtain a hollow resin particle which is excellent in mechanical strength and hardly collapsed.

The method for producing hollow resin particles of the present disclosure includes a mixture liquid preparation step, a suspension preparation step, a polymerization step and a solvent removal step, and may further include other steps, if necessary, within a range not impairing the effect.

The method for producing hollow resin particles of the present disclosure includes the following (1) mixture liquid preparation step, (2) suspension preparation step, (3) polymerization step and (4) solvent removal step, and may further include other steps, if necessary, within a range not impairing the effect;

(1) Mixture Liquid Preparation Step
   a step comprising preparing a mixture liquid which contains a polymerizable monomer containing a non-crosslinkable monomer and a crosslinkable monomer, a hydrocarbon solvent, a polymerization initiator and an aqueous medium;

(2) Suspension Preparation Step
   a step comprising, by suspending the mixture liquid, preparing a suspension in which polymerizable monomer droplets including the hydrocarbon solvent are dispersed in the aqueous medium;

(3) Polymerization Step
   a step comprising, by a polymerization reaction of the suspension, preparing a precursor composition containing a precursor particle having a hollow portion in which the hydrocarbon solvent is included; and (4) Solvent Removal Step
   a step comprising removing the hydrocarbon solvent included in the precursor particle.

FIG. 1 is a schematic diagram showing an embodiment of the production method of the present disclosure. Diagrams (1) to (4) in FIG. 1 correspond to the above steps (1) to (4). The white arrows between the figures indicate the order of the steps. It should be noted that FIG. 1 is only a schematic diagram for explanation, and the production method of the present disclosure is not limited to that shown in the drawings. Also, the structure, size, and shape of the materials used in the production method of the present disclosure are not limited to the structure, size, and shape of the various materials in these figures.

The diagram (1) of FIG. 1 is a cross-sectional schematic view showing one embodiment of a mixture liquid in the mixture liquid preparation step. As shown in this figure, the mixture liquid includes an aqueous medium 1 and a low polarity material 2 dispersed in the aqueous medium 1. Here, the low polarity material 2 is a material having a low polarity and which is difficult to mix with the aqueous medium 1. In the present disclosure, the low polarity material 2 contains a polymerizable monomer, a hydrocarbon solvent, and an oil-soluble polymerization initiator.

The diagram (2) of FIG. 1 is a cross-sectional schematic illustrating one embodiment of a suspension in a suspension preparation step. The suspension contains an aqueous medium 1 and micelles 10 (polymerizable monomer droplets) dispersed in the aqueous medium 1. The micelle 10 is constituted by surrounding a periphery of an oil-soluble monomer composition 4 (containing an oil-soluble polymerization initiator 5, etc.) by a suspension stabilizer 3 (e.g., a surfactant or the like). Note that, in the present disclosure, a composition containing a polymerizable monomer may be referred to as a monomer composition.

The diagram (3) of FIG. 1 is a cross-sectional schematic diagram illustrating one embodiment of the precursor composition after the polymerization step. The precursor composition includes an aqueous medium 1 and precursor particles 20 dispersed in the aqueous medium 1. The shell 6 forming the outer surface of the precursor particles 20 is formed by polymerization or the like of the polymerizable monomer in the micelle 10 described above. The hollow portion inside the shell 6 includes a hydrocarbon solvent 7. In the present disclosure, a composition containing precursor particles is referred to as a precursor composition.

The diagram (4) of FIG. 1 is a cross-sectional schematic view showing one embodiment of the hollow resin particles after the solvent removal step. The diagram (4) of FIG. 1 shows a state in which the hydrocarbon solvent 7 is removed from the state of (3) of FIG. 1. As a result, hollow resin particles 100 including an aqueous medium 1 in the hollow portion 8 of the shell 6 are obtained.

Hereinafter, the above-mentioned four steps and other steps will be described in order.

(1) Mixture Liquid Preparation Step

This step is a step comprising preparing a mixture liquid containing a polymerizable monomer containing a non-crosslinkable monomer and a crosslinkable monomer, a hydrocarbon solvent, a polymerization initiator and an aqueous medium, and in the present disclosure, an oil-soluble polymerization initiator is used as a polymerization initiator.

Other materials such as suspension stabilizers may be further contained in the mixture liquid. The material of the mixture liquid will be described in order of (A) a polymerizable monomer, (B) an oil-soluble polymerization initiator, (C) a hydrocarbon solvent, (D) a suspension stabilizer and (E) an aqueous medium.

(A) Polymerizable Monomer

In the present disclosure, a polymerizable monomer contains a non-cross linkable monomer and a crosslinkable monomer in combination. A polymerizable monomer is a compound having a polymerizable functional group. The non-crosslinkable monomer is a polymerizable monomer having only one polymerizable functional group, and the crosslinkable monomer is a polymerizable monomer having two or more polymerizable functional groups and capable of forming a crosslinking bond in the resin by a polymerization reaction. As the polymerizable monomer, a compound having an ethylenically unsaturated bond as a polymerizable functioned group is generally used.

[Non-Crosslinkable Monomer]

As the non-crosslinkable monomer, a monovinyl monomer is preferably used. A monovinyl monomer is a compound having one polymerizable vinyl functional group. Examples of the monovinyl monomer include a hydrophilic monomer and a non-hydrophilic monomer. The hydrophilic monomer preferably has a solubility in water of 1% by mass or more, and the non-hydrophilic monomer preferably has a solubility in water of less than 1% by mass.

Examples of the hydrophilic monomer include a monomer having a hydrophilic group such as an acid group-containing monomer, a hydroxyl group-containing monomer, an amide group-containing monomer and a polyoxyethylene group-containing monomer.

An acid group-containing monomer is a monomer containing an acid group. An acid group includes any of a proton donating group (Brønsted acid group) and an electron pair accepting group (Lewis acid group). When an acid group-containing monomer is used as the hydrophilic monomer, it is preferable in terms of obtaining hollow resin particles having high heat resistance.

The acid group-containing monomer is not particularly limited as long as it has an acid group, and examples thereof include a carboxyl group-containing monomer and a sulfonic acid group-containing monomer.

Examples of the carboxyl group-containing monomer include ethylenically unsaturated carboxylic acid monomers such as acrylic acid, methacrylic acid, crotonic acid, cinnamic acid, itaconic acid, fumaric acid, maleic acid and butenetricarboxylic acid; and monoalkyl esters of unsaturated dicarboxylic acids such as monoethyl itaconate, monobutyl fumarate and monobutyl maleate. Of these, acrylic acid, methacrylic acid and maleic acid are preferred, and acrylic acid and methacrylic acid are more preferred.

Examples of the sulfonic acid group-containing monomer include styrenesulfonic acid and the like.

Examples of the hydroxyl group-containing monomer include 2-hydroxyethyl (meth)acrylate, 2-hydroxypropyl (meth)acrylate and 4-hydroxybutyl (meth)acrylate.

Examples of the amide group-containing monomer include acrylamide and dimethylacrylamide.

Examples of the polyoxyethylene group-containing monomer include methoxypolyethylene glycol (meth)acrylate and the like.

Examples of non-hydrophilic monomers include acrylic monovinyl monomers such as methyl (meth)acrylate, ethyl (meth)acrylate, butyl (meth)acrylate, 2-ethylhexyl (meth)acrylate, lauryl (meth)acrylate; aromatic vinyl monomers such as styrene, vinyltoluene, α-methylstyrene, p-methylstyrene, styrene halide; mono-olefin monomers such as ethylene, propylene, butylene; diene monomers such as butadiene, isoprene; carboxylic acid vinyl ester monomers such as vinyl acetate; a halogenated vinyl monomer such as vinyl chloride; a halogenated vinylidene monomer such as vinylidene chloride; and a vinyl pyridine monomer.

Of these, an acrylic monovinyl monomer is preferred from the viewpoint of easy stability of the polymerization reaction and excellent heat resistance, and at least one selected from the group consisting of butyl acrylate and methyl methacrylate is more preferred.

In the present disclosure, (meth)acrylate means each of acrylate or methacrylate, and (meth)acrylic means each of acrylic or methacrylic.

Each of these non-crosslinkable monomers may be used alone or in combination of two or more thereof.

Among them, it is preferable that the non-crosslinkable monomer contains at least a hydrophilic monomer from the viewpoint of easily improving the void ratio of the hollow resin particles. By including a hydrophilic monomer, the polymerization reaction tends to proceed stably, and the mechanical strength of the hollow resin particles tends to be improved.

The content of the hydrophilic monomer is preferably 20 parts by mass or more, more preferably 25 parts by mass or more, and still more preferably 30 parts by mass or more, per 100 parts by mass of the total mass of the non-crosslinkable monomer.

In the present disclosure, among them, it is preferable that the non-crosslinkable monomer contains a carboxyl group-containing monomer as a hydrophilic monomer.

When the non-crosslinkable monomer contains a carboxyl group-containing monomer, the content of the carboxyl group-containing monomer is preferably from 1 part by mass to 10 parts by mass, per 100 parts by mass of the total mass of the polymerizable monomer. By containing the carboxyl group-containing monomer in a content within the above range, the amount of aggregate generated during the polymerization reaction tends to be reduced, and also, the mechanical strength of the hollow resin particles tends to be improved, and the residual amount of the sparingly water-soluble solvent in the hollow resin particles tends to be reduced. The content of the carboxyl group-containing monomer is more preferably from 1 part by mass to 7 parts by mass, per 100 parts by mass of the total mass of the polymerizable monomer.

The non-crosslinkable monomer may not contain a non-hydrophilic monomer, but may contain a hydrophilic monomer and a non-hydrophilic monomer in combination from the viewpoint of easily improving the heat resistance of the hollow resin particles.

When the non-crosslinkable monomer contains a non-hydrophilic monomer, the content of the non-hydrophilic monomer is not particularly limited, but is preferably 80 parts by mass or less, more preferably 75 parts by mass or less, and still more preferably 70 parts by mass or less, per 100 parts by mass of the total mass of the non-crosslinkable monomer from the viewpoint of sufficiently containing the hydrophilic monomer.

Further, it is desirable that the non-crosslinkable monomer does not contain a compound containing a nitrile group such as acrylonitrile and methacrylonitrile from the viewpoint of suppressing a decrease in heat resistance and a decrease in void ratio of the hollow resin particles.

[Crosslinkable Monomer]

In the present disclosure, a polymerizable monomer contains a crosslinkable monomer and a non-crosslinkable monomer in combination, wherein the total content of the crosslinkable monomer is from 80 parts by mass to 98 parts by mass, per 100 parts by mass of the total mass of the polymerizable monomer, and the content of the tri- or higher functional crosslinkable monomer is from 10 parts by mass to 98 parts by mass, per 100 parts by mass of the total mass of the polymerizable monomer. Since the crosslinkable monomers are linked to each other by having two or more polymerizable functional groups, the crosslinking density of the shell is increased. In the present disclosure, by including a crosslinkable monomer and a non-crosslinkable monomer in combination in the above specific ratio, a shell having a communication hole at an appropriate ratio, and having a crosslinked structure excellent in mechanical strength and a thickness excellent in mechanical strength, can be formed.

In the present disclosure, a crosslinkable monomer contains a tri- or higher functional crosslinkable monomer having three or more polymerizable functional groups. Examples of the tri- or higher functional crosslinkable monomer include trimethylolpropane tri (meth)acrylate, ditrimethylolpropane tetra (meth) acrylate, pentaerythritol tri (meth) acrylate, pentaerythritol tetra (meth) acrylate, dipentaerythritol hexa (meth) acrylate and triallyl cyanurate. Among these, trimethylolpropane tri (meth)acrylate, ditrimethylolpropane tetra(meth)acrylate, pentaerythritol tri(meth) acrylate, pentaerythritol tetra(meth)acrylate and dipentaerythritol hexa (meth)acrylate are preferable. As the tri- or higher functional crosslinkable monomer, among them, a crosslinkable monomer having three or more and six or less functional groups is preferred.

In the present disclosure, the crosslinkable monomer may further contain a bifunctional crosslinkable monomer having only two polymerizable functional groups. Examples of the bifunctional crosslinkable monomer include divinylbenzene, divinylbiphenyl, divinylnaphthalene, diallyl phthalate, allyl (meth)acrylate and ethylene glycol di(meth)acrylate. Of these, ethylene glycol di(meth)acrylate is preferred.

In the mixture liquid obtained in the mixture liquid preparation step, the total content of the crosslinkable monomer is from 80 parts by mass to 98 parts by mass, preferably more than 85 parts by mass, more preferably 90 parts by mass or more, and still more preferably 95 parts by mass or more, per 100 parts by mass of the total mass of the polymerizable monomer.

In the mixture liquid obtained in the mixture liquid preparation step, the total content of the tri- or higher functional crosslinkable monomer may be from 10 parts by mass to 98 parts by mass, per 100 parts by mass of the total mass of the polymerizable monomer, and is not particularly limited, but the content may be adjusted according to the number of polymerizable functional groups contained in one molecule in view of the balance of the void ratio, the particle diameter, and the mechanical strength of the hollow resin particles. For example, the content of a crosslinkable monomer having five or more polymerizable functional groups may be from 1 part by mass to 50 parts by mass, from 3 parts by mass to 30 parts by mass, or from 5 parts by mass to 20 parts by mass, per 100 parts by mass of the total mass of the polymerizable monomer. In the absence of a cross-linkable monomer having five or more functional groups, the content of a cross-linkable monomer having three or four polymerizable functional groups is preferably from 20 parts by mass to 98 parts by mass, more preferably from 25 parts by mass to 98 parts by mass, and still more preferably from 30 parts by mass to 98 parts by mass, per 100 parts by mass of the total mass of the polymerizable monomer.

In addition, although there is no particular limitation, the crosslinkable monomer may contain a bifunctional crosslinkable monomer and a tri- or higher functional crosslinkable monomer in combination from the viewpoint of balancing the void ratio, the particle diameter and the mechanical strength of the hollow resin particles, and reducing the residual amount of the sparingly water-soluble solvent.

When the crosslinkable monomer contains a bifunctional crosslinkable monomer, a content of a bi- or higher functional crosslinkable monomer in the mixture liquid is preferably from 10 parts by mass to 90 parts by mass, and more preferably from 30 parts by mass to 85 parts by mass, per 100 parts by mass of the total mass of the polymerizable monomer.

In addition, when a bifunctional crosslinkable monomer is contained, the content of a crosslinkable monomer having three to four functional groups is preferably from 10 parts by mass to 85 parts by mass, and more preferably from 20 parts by mass to 65 parts by mass, per 100 parts by mass of the total mass of the polymerizable monomer.

The content of the polymerizable monomer (all of the non-crosslinkable monomer and the crosslinkable monomer) in the mixture liquid is not particularly limited, but is preferably from 5 parts by mass to 35 parts by mass, and more preferably from 6 parts by mass to 32 parts by mass, per 100 parts by mass of the total mass of the components of in the mixture liquid excluding the aqueous medium, from the viewpoint of the balance of the void ratio, the particle diameter and the mechanical strength of the hollow resin particles and reducing the residual amount of the sparingly water-soluble solvent.

(B) Oil-Soluble Polymerization Initiator

In the present disclosure, an oil-soluble polymerization initiator is used as a polymerization initiator.

The oil-soluble polymerization initiator is not particularly limited as long as it is a lipophilic one having a solubility in water of 0.2% by mass or less. Examples of the oil-soluble polymerization initiator include benzoyl peroxide, lauroyl peroxide, t-butyl peroxide-2-ethylhexanoate, 1,2'-azobis(2, 4-dimethylvaleronitrile) and azobisisobutyronitrile.

The content of the oil-soluble polymerization initiator is preferably from 0.1 parts by mass to 10 parts by mass, more preferably from 0.5 parts by mass to 7 parts by mass, and still more preferably from 1 part by mass to 5 parts by mass, per 100 parts by mass of the total mass of the polymerizable monomer in the mixture liquid. When the content of the oil-soluble polymerization initiator is from 0.1 parts by mass to 10 parts by mass, the polymerization reaction is sufficiently proceeded, and there is a small fear that the oil-soluble polymerization initiator remains after the completion of the polymerization reaction, and there is also a small fear that an unexpected side reaction proceeds.

(C) Hydrocarbon Solvent

In the present disclosure, a hydrocarbon solvent is used as a non-polymerizable and sparingly water-soluble organic solvent.

The hydrocarbon solvent has a function of forming a hollow portion inside the particles. In the suspension preparation step described later, a suspension in which a polymerizable monomer droplet including a hydrocarbon solvent is dispersed in an aqueous medium is obtained. In the suspension preparation step, as a result of phase separation occurring in the polymerizable monomer droplet, a hydrocarbon solvent having low polarity tends to collect inside the polymerizable monomer droplet. Finally, in the polymerizable monomer droplet, a hydrocarbon solvent is distributed in the interior thereof, and other materials other than the hydrocarbon solvent are distributed at the periphery thereof according to their respective polarities. Then, in a polymerization step described later, a precursor composition containing precursor particles including a hydrocarbon solvent is obtained. In other words, since the hydrocarbon solvent collects inside the particles, a hollow portion filled with a hydrocarbon solvent is formed inside the obtained precursor particles.

The hydrocarbon solvent used in the production method of the present disclosure has a ratio of a saturated hydrocarbon solvent of 50% by mass or more in a total amount of 100% by mass of a hydrocarbon solvent. Thus, since phase separation is sufficiently occurred in the polymerizable monomer liquid droplets, hollow resin particles having only one hollow portion are easily obtained, and generation of porous particles can be suppressed. The ratio of the saturated hydrocarbon solvent is preferably 60% by mass or more, more preferably 80% by mass or more, from the viewpoint of further suppressing the formation of porous particles, and since the hollow portion of each hollow resin particle tends to be uniform.

Examples of the saturated hydrocarbon solvent contained in the hydrocarbon solvent include butane, pentane, normal hexane, cyclohexane, heptane and octane.

As a solvent other than the saturated hydrocarbon solvent contained in the hydrocarbon solvent, for example, an aromatic hydrocarbon solvent such as benzene, toluene or xylene can be preferably used.

Further, as the hydrocarbon solvent, a hydrocarbon solvent having 4 to 7 carbon atoms is preferred. Hydrocarbon compounds having 4 to 7 carbon atoms are easily encapsulated in the precursor particles during the polymerization step and can be easily removed from the precursor particles during the solvent removal step. Among them, a hydrocarbon solvent having 5 or 6 carbon atoms is particularly preferred.

In addition, although there is no particular limitation, as the hydrocarbon solvent, from the point of easy removal in the solvent removal step described later, a solvent having a boiling point of 130° C. or less is preferable, and a solvent having a boiling point of 100° C. or less is more preferred. In addition, from the viewpoint of easily being encapsulated in the precursor particles, as the hydrocarbon solvent, a solvent having a boiling point of 50° C. or more is preferable, and a solvent having a boiling point of 60° C. or more is more preferred.

Further, it is preferable that the hydrocarbon solvent, has a relative permittivity of 3 or less at 20° C. The relative permittivity is one of indices indicating the height of polarity of a confound. When the relative permittivity of the hydrocarbon solvent is sufficiently small to be 3 or less, it is considered that phase separation proceeds promptly in the polymerizable monomer droplet, and a hollow is easily formed.

Examples of the solvents having a relative permittivity of 3 or less at 20° C. are as follows. Figures in parentheses are values of relative permittivity.

Heptane (1.9), cyclohexane (2.0), normal hexane (1.9), benzene (2.3), toluene (2.4) and octane (1.9).

Regarding the relative permittivity at 20° C., values written in known literatures (for example, the Chemical Society of Japan, as editor, "Kagaku Binran, Kiso Hen, Kaitei 4 Ban", pp. II-498 to II-503, published by Maruzen Publishing Co., Ltd. on Sep. 30, 1993) and other technical information may be used as reference. Examples of the method for measuring the relative permittivity at 20° C. include a relative permittivity test which is in conformity with 23 of JIS C 2101:1999 and which is carried out at a measuring temperature set to 20° C.

In the present disclosure, the content of the hydrocarbon solvent in the mixture liquid is from 300 parts by mass to 1500 parts by mass, per 100 parts by mass of the total mass of the polymerizable monomer. When the content of the hydrocarbon solvent is within the above range, the mechanical strength of the hollow resin particles can be maintained while improving the void ratio of the hollow resin particles, and the hydrocarbon solvent in the particles can be easily removed in the solvent removal step. The content of the hydrocarbon solvent in the mixture liquid is preferably from 400 parts by mass to 1400 parts by mass, and more preferably from 500 parts by mass to 1000 parts by mass, per 100 parts by mass of the total mass of the polymerizable monomer.

Further, the content of the hydrocarbon solvent per 100 parts by mass of the total mass of the crosslinkable monomer is preferably more than 600 parts by mass and 1500 parts by mass or less.

(D) Suspension Stabilizer

In the present disclosure, the mixture liquid may contain a suspension stabilizer. The suspension stabilizer is an agent which stabilizes a suspension state in a suspension in a suspension polymerization method described later. As the suspension stabilizer, a surfactant may be contained. The surfactant is a material which forms micelles containing lipophilic components such as a non-crosslinkable monomer, a crosslinkable monomer, an oil-soluble polymerization initiator and a hydrocarbon solvent in a suspension polymerization method described later.

As the surfactant, any of a cationic surfactant, an anionic surfactant and a nonionic surfactant can be used, and any of them can be used in combination. Of these, anionic surfactants and nonionic surfactants are preferred, and anionic surfactants are more preferred.

Examples of the anionic surfactant include sodium dodecylbenzenesulfonate, sodium lauryl sulfate, sodium dialkylsulfosuccinate and formalin condensate salts of naphthalenesulfonic acid.

Examples of the nonionic surfactant include polyoxyethylene alkyl ether, polyoxyethylene alkyl ester and polyoxyethylene sorbitan alkyl ester.

Examples of the cationic surfactant include didecyldimethylammonium chloride and stearyltrimethylammonium chloride.

Further, as a suspension stabilizer, a sparingly water-soluble inorganic compound, a water-soluble polymer or the like may be contained.

When the mixture contains a suspension stabilizer, the content of the suspension stabilizer is preferably from 0.1 parts by mass to 4 parts by mass, and more preferably from 0.5 parts by mass to 3 parts by mass, per 100 parts by mass of the total mass of the polymerizable monomer in the mixture. When the content of the suspension stabilizer is 0.1 parts by mass or more, micelles are easily formed in the aqueous medium. On the other hand, when the content of the suspension stabilizer is 4 parts by mass or less, a decrease in productivity due to foaming hardly occurs in the step of removing the hydrocarbon solvent.

(E) Aqueous Medium

In the present disclosure, an aqueous medium is a medium selected from the group consisting of water, a hydrophilic solvent, and a mixture of water and a hydrophilic solvent.

The hydrophilic solvent in the present disclosure is not particularly limited as long as it is sufficiently mixed with water and does not cause phase separation. Examples of the hydrophilic solvents include alcohols such as methanol and ethanol; tetrahydrofuran (THF); and dimethyl sulfoxide (DMSO).

Among the aqueous media, water is preferably used because of its high polarity. When a mixture of water and a hydrophilic solvent is used, it is important that the overall polarity of the mixture does not become too low from the viewpoint of forming a polymerizable monomer droplet. In this case, for example, a mixing ratio (mass ratio) of water and a hydrophilic solvent may be set as water:hydrophilic solvent=99:1 to 50:50.

In the mixture liquid preparation step, a mixture liquid is obtained by simply mixing each of the above materials and, if necessary, other materials, and appropriately stirring or the like. In the mixture liquid, an oil phase containing a lipophilic material such as (A) the polymerizable monomer, (B) the oil-soluble polymerization initiator, and (C) the hydrocarbon solvent is dispersed in an aqueous phase containing (D) the suspension stabilizer, (E) the aqueous medium and the like, in a size of about several millimeters in particle size. The dispersion state of these materials in the mixture liquid can be observed even by the naked eye depending on the type of material.

The mixture liquid preparation step may be a step of mixing an oil phase containing a lipophilic material and an aqueous phase containing a hydrophilic material. By preparing the oil phase and the aqueous phase separately and then mixing them, it is possible to produce hollow resin particles having a uniform composition of the shell portion.

(2) Suspension Preparation Step

This step is a step comprising preparing a suspension in which a polymerizable monomer droplet including a hydrocarbon solvent is dispersed in an aqueous medium by suspending the above-described mixture liquid.

Although there is no particular limitation on the suspension method for forming the polymerizable monomer liquid droplets, for example, the suspension method is carried out using a device capable of strong agitation such as an (in-line) emulsification disperser (manufactured by Pacific Machinery & Engineering Co., Ltd.; product name: MILDER), a high-speed emulsification disperser (manufactured by PRIMIX Corporation; product name: T.K. HOMOMIXER MARK II TYPE), and the like.

In the suspension prepared in the suspension preparation step, a polymerizable monomer droplet including a hydrocarbon solvent is uniformly dispersed in an aqueous medium. The polymerizable monomer droplet is a droplet having a diameter of about 0.8 μm to 25 μm, which is difficult to observe by the naked eye, and can be observed by a known observation instrument such as an optical microscope, for example.

In the suspension preparation step, phase separation occurs in the polymerizable monomer liquid droplets, so that a hydrocarbon solvent having low polarity tends to collect inside the polymerizable monomer liquid droplets. As a result, a hydrocarbon solvent is distributed inside the obtained polymerizable monomer droplet, and a material other than a hydrocarbon solvent is distributed at its periphery.

In the present disclosure, a suspension polymerization method is employed rather than an emulsion polymerization method. Accordingly, an advantage of using a suspension polymerization method and an oil-soluble polymerization initiator while contrasting with an emulsion polymerization method will be described below.

Figure 3:
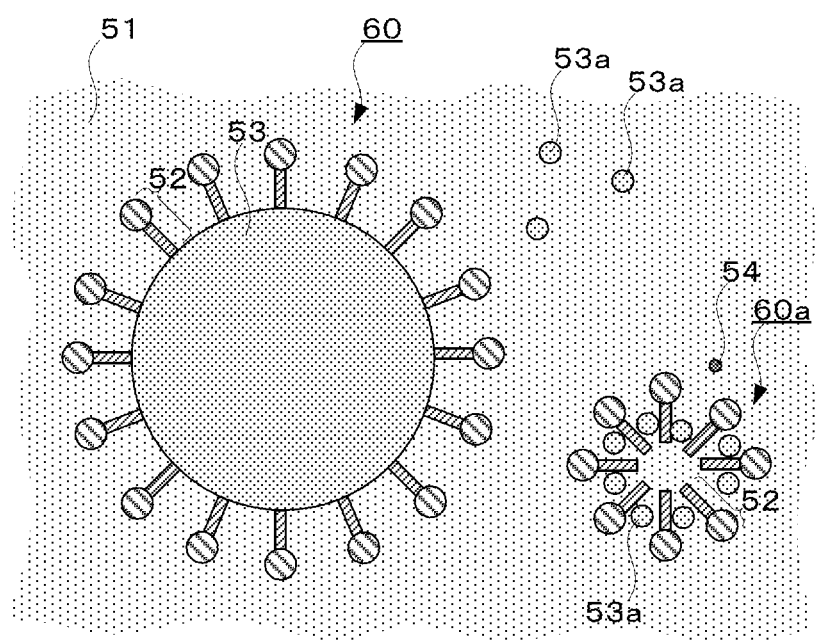
FIG. 3 is a schematic diagram showing a dispersion for conventional emulsion polymerization.

FIG. 3 is a schematic diagram showing a dispersion for emulsion polymerization. The micelle 60 in FIG. 3 schematically shows a cross section thereof.

FIG. 3 shows a dispersion of micelles 60, micellar precursor 60a, monomers 53a eluted in a solvent and water-soluble polymerization initiator 54 in an aqueous medium 51. The micelle 60 is constituted by surrounding the periphery of the oil-soluble monomer composition 53 by the surfactant 52. In the monomer composition 53, a monomer or the like serving as a raw material of a polymer is included, but a polymerization initiator is not included.

On the other hand, although the micellar precursor 60a is an aggregate of the surfactant 52, it does not contain a sufficient amount of the monomer composition 53 inside thereof. The micellar precursor 60a grows up into the micelle 60 by incorporating the monomer 53a eluted in the solvent into the inside, or procuring a part of the monomer composition 53 from other micelles 60 or the like.

The water-soluble polymerization initiator 54 penetrates into the inside of the micelle 60 and the micelle precursor 60a while diffusing in the aqueous medium 51, thereby promoting growth of oil droplets inside these. Therefore, in the emulsion polymerization method, although each micelle 60 is monodispersed in the aqueous medium 51, the particle size of the micelle 60 is predicted to grow to several hundred nanometers.

Figure 2:
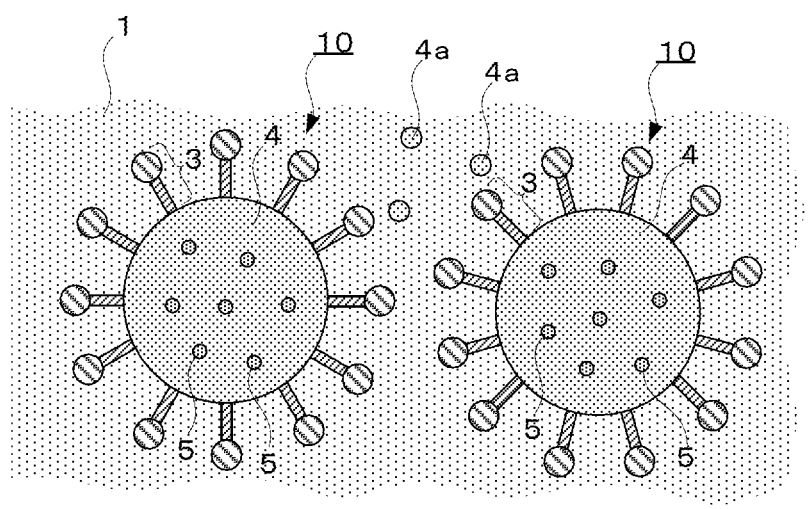
FIG. 2 is a schematic diagram showing an embodiment of a suspension in a suspension preparation step.

FIG. 2 is a schematic diagram showing an embodiment of a suspension in a suspension preparation step. The micelle 10 in FIG. 2 schematically shows a cross section thereof. Note that FIG. 2 is a schematic diagram only, and the suspension in the present disclosure is not necessarily limited to that shown in FIG. 2. Part of FIG. 2 corresponds to the diagram (2) of FIG. 1 described above.

FIG. 2 shows the dispersion of the micelle 10 and the polymerizable monomer 4a (including the non-crosslinkable monomer and the cross linkable monomer) dispersed in the aqueous medium 1. The micelle 10 is constituted by surrounding the periphery of the oil-soluble monomer composition 4 by the surfactant 3. In the monomer composition 4, an oil-soluble polymerization initiator 5 and a polymerizable monomer (including a non-crosslinkable monomer and a crosslinkable monomer) and a hydrocarbon solvent (both not shown) are contained.

As shown in FIG. 2, in the suspension preparation step, a micro oil droplet containing a monomer composition 4 is previously formed inside the micelle 10, and then a polymerization initiating radical is generated in the micro oil droplet by an oil-soluble polymerization initiator 5. Therefore, it is possible to produce precursor particles having a target particle size without excessively growing fine oil droplets.

Further, as can be seen from comparison of the suspension polymerization (FIG. 2) and the emulsion polymerization (FIG. 3), in the suspension polymerization (FIG. 2), there is no chance that the oil-soluble polymerization initiator 5 comes into contact with the polymerizable monomer 4a dispersed in the aqueous medium 1. Therefore, by using an oil-soluble polymerization initiator, it is possible to suppress generation of extra polymer particles such as dense real particles having a relatively small particle diameter in addition to resin particles having a target hollow portion.

(3) Polymerization Step

This step is a step comprising preparing a precursor composition containing precursor particles having a hollow portion and including a hydrocarbon solvent in the hollow portion by subjecting the above-described suspension to a polymerization reaction.

In the polymerization step, the polymerizable monomer in the liquid droplet is polymerized while the polymerizable monomer droplet includes a hydrocarbon solvent, whereby a precursor particle, having a shell containing a resin which is a polymer of a polymerizable monomer, and a hollow portion filled with a hydrocarbon solvent is formed.

In the production method of the present disclosure, in the polymerization step, the polymerizable monomer droplets are subjected to the polymerization reaction in a condition in which the specific hydrocarbon solvent is included, so that the polymerization reaction tends to proceed while maintaining the shape, and the size and the void ratio of the precursor particles can be easily adjusted. Further, since the specific polymerizable monomer and the specific hydrocarbon solvent are used in combination, the polarity of the hydrocarbon solvent is low with respect to the shell of the precursor particles, and the hydrocarbon solvent is hardly familiar with the shell, so that phase separation is sufficiently occurred and only one hollow portion is easily generated. Further, by adjusting the amount of the hydrocarbon solvent, it is possible to easily adjust the size and the void ratio of the precursor particles.

There is no particular limitation on the polymerization method performed in the polymerization step, and for example, a batch type, a semi-continuous type, a continuous type or the like can be employed. The polymerization temperature is preferably from 40° C. to 80° C., and more preferably from 50° C. to 70° C. Also, the reaction time of the polymerization is preferably from 1 hour to 20 hours, and more preferably from 2 hours to 15 hours.

(4) Solvent Removal Step

This step is a step comprising removing the hydrocarbon solvent included in the precursor particles.

In the solvent removal step, usually, in the precursor composition obtained by the polymerization step, the hydrocarbon solvent included in the precursor particles is removed without separating the precursor particles from an aqueous medium. Thus, it is possible to obtain hollow resin particles in which the hollow portion is filled with an aqueous medium.

The solvent removal step is preferably a step comprising removing the hydrocarbon solvent included in the precursor particle in the precursor composition by bubbling an inert gas into the precursor composition at a temperature higher than or equal to a temperature subtracted from the boiling point of the hydrocarbon solvent by 35° C., in view of reducing the residual amount of the hydrocarbon solvent in the obtained hollow resin particles.

Here, when the hydrocarbon solvent is a mixed solvent containing a plurality of kinds of hydrocarbon solvents and has a plurality of boiling points, the boiling point of the hydrocarbon solvent in the solvent removing step is defined as the boiling point of the solvent which has the highest boiling point among the solvents contained in the mixed solvent, that is, the highest boiling point among the plurality of boiling points.

The temperature at the time of bubbling the inert gas into the precursor composition is preferably a temperature higher than or equal to a temperature subtracted from the boiling point of the hydrocarbon solvent by 30° C., and more preferably a temperature higher than or equal to a temperature subtracted from the boiling point of the hydrocarbon solvent by 20° C., from the point of reducing the residual amount of the hydrocarbon solvent in the hollow resin particles. Note that the temperature at the time of bubbling is usually a temperature equal to or higher than the polymerization temperature in the polymerization step. Although not particularly limited, the temperature at the time of the bubbling may be 50° C. or more and 100° C. or less.

The inert gas to be bubbled is not particularly limited, and examples thereof include nitrogen and argon.

The condition of bubbling is appropriately adjusted so as to be able to remove the hydrocarbon solvent included in the precursor particles depending on the type and amount of the hydrocarbon solvent, and is not particularly limited, and for example, an inert gas may be bubbled in an amount of from 1 L/min to 3 L/min for 1 hour to 10 hours.

In addition to the steps (1) to (4) described above, the method for producing hollow resin particles of the present disclosure may further include other steps such as, for example, (5) a re-substitution step of the hollow portion.

(5) Re-Substitution Step of the Hollow Portion

This step is a step comprising replacing the aqueous medium inside the hollow resin particles with another solvent or gas after the solvent removing step. By the re-substitution step of the hollow portion, it is possible to change the environment inside the hollow resin particles, to selectively confine the molecules inside the hollow resin particles, or to modify the chemical structure inside the hollow resin particles according to the application.

Examples of the method of replacing an aqueous medium inside the hollow resin particles with a gas include a method of filtering a slurry containing hollow resin particles obtained after the solvent removal step and drying the filtered hollow resin particles. The method of drying is not particularly limited, and a known method can be employed, and examples thereof include a reduced pressure drying method, a heat drying method, a flash drying method and a combination of these methods.

When the heat drying method is used, it is preferable to set the heating temperature to 50° C. to 150° C. from the viewpoint of maintaining the shell structure of the hollow resin particles.

The drying atmosphere is not particularly limited and can be appropriately selected depending on the application of the hollow resin particles. Examples of the dry atmosphere include air, oxygen, nitrogen and argon.

Since the production method of the present disclosure can suppress the decrease in the particle diameter of the hollow resin particles, the volume average particle diameter of the hollow resin particles can be set to from 1 μm to 25 μm, more preferably from 1 μm to 20 μm, still more preferably from 1 μm to 5 μm, and particularly preferably from 2 μm to 4.5 μm. When the volume average particle diameter of the hollow resin particles is equal to or higher than the lower limit value, dispersibility of the hollow resin particles is improved. When the volume average particle diameter of the hollow resin particles is equal to or smaller than the upper limit value, the mechanical strength is improved.

The volume average particle diameter of the hollow resin particles can be obtained by measuring the particle diameter of the hollow resin particles with a laser diffraction type particle size distribution measuring apparatus and calculating the volume average thereof.

In addition, it is preferable that the hollow resin particles obtained by the production method of the present disclosure have a volume average particle diameter within the above range in a slurry containing an aqueous medium.

By the production method of the present disclosure, the shell thickness of the hollow resin particles can be set to from 0.020 μm to 0.150 μm, and more preferably from 0.025 μm to 0.100 μm. As a result, it is possible to suppress a decrease in mechanical strength while maintaining the void ratio of the hollow resin particles.

Note that, in the present disclosure, the thickness of the shell of the hollow resin particles is defined as an average value of the thickness at 20 points of the shell of the hollow resin particles. The thickness of the shell of the hollow resin particles can be measured, for example, by obtaining the pieces of the shell by dividing the hollow resin particles and observing the pieces by SEM.

In addition, in the production method of the present disclosure, the void ratio of the hollow resin particles can be set to 80% or more, preferably more than 80%, more preferably 85% or more, and still more preferably more than 85%. From the viewpoint of maintaining the strength of the particles, the void ratio of the hollow resin particles is preferably 95% or less.

The void ratio (%) of the hollow resin particles is calculated by the following equation from the shell thickness (t) of the hollow resin particles and the radius (r) of the hollow resin particles.

$$\text{Void ratio } (\%) = 100 \times (1 - t/r)^3$$

Here, the shell thickness (t) of the hollow resin particles is as described above. The radius (r) of the hollow resin particles is a value of ½ of the volume average particle diameter of the hollow resin particles.

The shape of the hollow resin particles obtained by the production method of the present disclosure is not particularly limited as long as it has only one hollow portion inside, and examples thereof include a spherical shape, an ellipse spherical shape, an irregular shape and the like. Of these, a spherical shape is preferred because of ease of production.

The hollow resin particles obtained by the production method of the present disclosure may have an average circularity of from 0.950 to 0.995.

An example of an image of the shape of the hollow resin particle is a swelled bag made of a thin film, and a cross-sectional view thereof is as shown by the hollow resin particle 100 in the diagram (4) in FIG. 1 described later. In this example, a thin film is provided on the outside.

The shape of the hollow resin particles can be confirmed by, for example, SEM or TEM. The internal shape of the hollow resin particles can be confirmed by SEM or TEM after cutting the particles by a known method.

Examples of the application of the hollow resin particles obtained by the production method of the present disclosure include an under-coating material for thermal paper, a plastic pigment and the like. Since useful components such as perfumes, chemicals, agrochemicals, ink components and the like can be enclosed inside the hollow resin particles obtained by the production method of the present disclosure by means such as an immersion treatment, a depressurized or pressurized immersion treatment, they can be utilized in various applications depending on the components contained inside.

Further, the hollow resin particles obtained by the production method of the present disclosure can be used as a filler of a molded article. Examples of a main component of a molded body include a thermoplastic resin and a thermosetting resin, and examples of the thermoplastic or thermosetting resin include polyethylene, polypropylene, polyvinyl chloride, polystyrene, polyurethane, epoxy resin, acrylonitrile-butadiene-styrene (ABS) resin, acrylonitrile-styrene (AS) resin, poly (meth) acrylate, polycarbonate, polyamide, polyimide, polyphenylene Ether, polyphenylene sulfide, polyester, and polytetrafluoroethylene. The molded body containing hollow resin particles obtained by the production method of the present disclosure may further contain fibrous such as carbon fibers, glass fibers, aramid fibers and polyethylene fibers. Since the hollow resin particles obtained by the production method of the present disclosure are hardly collapsed and the hydrocarbon solvent is sufficiently removed, they can be contained as a filler even in a molded body formed using a thermoplastic or thermosetting resin and a molded body formed using a material containing a thermoplastic or thermosetting resin and a fiber.

EXAMPLES

Hereinbelow, the present disclosure will be described in more detail, using Examples and Comparative Examples. However, the present disclosure is not limited to the following examples. In the following description, "part(s)" and "%" are on a mass basis unless otherwise specified.

Example 1

(1) Mixture Liquid Preparation Step

First, the following materials were mixed, and the obtained mixture was used as an oil phase.
Methacrylic acid: 5 parts
Ethylene glycol dimethacrylate: 65 parts
Trimethylolpropane trimethacrylate: 30 parts
2,2'-Azobis(2,4-dimethylvaleronitrile) (an oil-soluble polymerization initiator manufactured by Wako Pure Chemical Industries, Ltd., product name: V-65): 3 parts
Cyclohexane: 400 parts On the other hand, 3.0 parts of a surfactant was added to 1160 parts of ion-exchanged water and mixed, then the obtained mixture was used as an aqueous phase.

The aqueous phase and the oil phase were mixed, thereby preparing a mixture liquid.

(2) Suspension Preparation Step

The mixture liquid obtained in the above mixture liquid preparation step was suspended by stirring under a condition of a rotation speed of 15,000 rpm by an in-line emulsification disperser (manufactured by Pacific Machinery & Engineering Co., Ltd.; product name: MILDER), and a suspension in which a polymerizable monomer droplet including cyclohexane was dispersed in water was prepared.

(3) Polymerization Step

The suspension obtained in the above suspension preparation step was stirred under a temperature condition of 65° C. in a nitrogen atmosphere for 4 hours to carry out the polymerization reaction. By this polymerization reaction, a precursor composition containing precursor particles including cyclohexane was prepared.

(4) Solvent Removal Step

The precursor composition obtained in the above polymerization step was bubbled with 2 L/min of nitrogen for 4 hours under a temperature condition of 75° C., thereby removing cyclohexane included in the precursor particles to obtain a slurry containing hollow resin particles of Example 1.

Examples 2 to 13, Comparative Examples 1 to 9

A slurry containing hollow resin particles of each of Examples 2 to 13, and a slurry containing comparative resin particles of each of Comparative Examples 1 to 9 were obtained by a similar procedure to Example 1, except that the material and the amount of the oil phase prepared in the above "(1) mixture liquid preparation step" were set as shown in Tables 1-1, 1-2, 2-1 and 2-2, and the amount of ion-exchanged water in the aqueous phase was set as the amount shown in Tables 1-1, 1-2, 2-1 and 2-2, and the desolvent treatment temperature (temperature of bubbling) in the above "(4) solvent removal step" was set at the temperature shown in Tables 1-1, 1-2, 2-1 and 2-2.

[Evaluation]

The hollow resin particles obtained in each Example and each Comparative Example were measured and evaluated as follows.

When the obtained resin particles are mixed particles of hollow resin particles and porous particles, only hollow resin particles excluding porous particles were set as a measurement target in "2. Shell thickness of hollow resin particles" described later, and in other measurements and evaluations, mixed particles of hollow resin particles and porous particles were set as a measurement target.

1. Volume Average Particle Diameter of Hollow Resin Particles

The particle diameter of the hollow resin particles in the slurry was measured using a laser diffraction type particle size distribution measuring device (manufactured by HORIBA, Ltd., product name: LA-960), and the volume average of the measured hollow resin particles was calculated to obtain a volume average particle diameter.

2. Shell Thickness of the Hollow Resin Particles

The slurry obtained in each Example and each Comparative Example was filtered to separate the hollow resin particles, and the particles were dried at 60° C. for 5 hours under normal pressure. After the dried hollow resin particles were collapsed by a spatula, the cracked portions of the shells were observed using a scanning electron microscope (manufactured by JEOL Ltd., product name: JSM-7610F) to determine the thickness of the shell. Twenty points were observed, and the average thereof was taken as the shell thickness.

3. Void Ratio of Hollow Resin Particles

The void ratio of the hollow resin particles was calculated by the following equation from the radius (r) of the hollow resin particles obtained as a value of ½ of the volume average particle diameter of the hollow resin particles measured above, and the shell thickness (t) of the hollow resin particles measured above.

$$\text{Void ratio (\%)} = 100 \times (1 - t/r)^3$$

4. Presence or Absence of Collapsed Particles in an Aqueous Medium

The slurry obtained in each Example and each Comparative Example was observed by a digital microscope (manufactured by KEYENCE Co., Ltd., product name: VHX-5000) to confirm whether collapsed hollow resin particles exist or not in the slurry.

5. Percentage of Particles Collapsed after Drying

The slurry obtained in each Example and each Comparative Example was filtered to separate the hollow resin particles, and the particles were dried at 60° C. for 5 hours under normal pressure. The dried 500 hollow resin particles were observed using a scanning electron microscope (manufactured by JEOL Ltd., product name: JSM-7610F), and the number of the collapsed particles was confirmed to calculate the percentage (%) of the collapsed particles among the 500 hollow resin particles.

6. Porous Particle Content

The slurry obtained in each Example and each Comparative Example was filtered to separate the hollow resin particles or the mixed particles of the hollow resin particles and the porous particles, and the particles were dried at 60° C. under normal pressure for 5 hours. A total of 500 dried hollow resin particles and porous particles were observed using a transmission electron microscope (manufactured by Hitachi High-Tech Corporation, product name: HT7700), and the number of porous particles was confirmed to calculate the percentage (%) of the porous particles out of a total of 500 hollow resin particles and porous particles.

In the observation image, a resin particle having a shell portion observed densely outside the particle and only one hollow portion observed thinly in the center portion of the particle was identified as a hollow resin particle, and a particle in which the boundary between the shell portion and the hollow portion was vague and the entire particle was observed sparsely and densely was identified as a porous particle.

7. Amount of Residual Hydrocarbon Solvent in the Hollow Resin Particles

Approximately 300 mg of the slurry obtained in each Example and each Comparative Example was placed in a glass bottle with a 30 mL screw port, and accurately weighed. Subsequently, about 5 g of tetrahydrofuran (THF) was placed and accurately weighed. The mixture in the glass bottle was stirred by a stirrer for 1 hours to extract the hydrocarbon solvent included in the hollow resin particles. Stirring was stopped, and a resin component of hollow resin particles insoluble in THF was precipitated, and then a filter (manufactured by ADVANTEC Co., Ltd., product name: MEMBRANE FILTER 25JP020AN) was mounted on a syringe to obtain a sample liquid in which the precipitate was filtered off. The sample liquid was injected into gas chromatography (GC) to be analyzed.

On the other hand, 2 g of the slurry obtained in each Example and each Comparative Example was placed in an aluminum dish and dried at 105° C., whereby the particle concentration of the slurry was determined. The particle weight was calculated from the particle concentration, and the weight of the slurry used for sample preparation of GC, and the amount of the hydrocarbon solvent per unit mass of the particles (mass %) was determined from the peak area of GC and the calibration curve prepared in advance. Detailed analysis conditions are as follows.

(Analysis Conditions)

Equipment: GC-2010 (manufactured by SHIMADZU CORPORATION)

Columns: DB-5 (manufactured by Agilent Technology Co., Ltd., 0.25 μm in film thickness, 0.25 mm in inner diameter, 30 m in length)

Detector: FID
Carrier gas: nitrogen (linear velocity: 28.3 cm/sec)
Injection port temperature: 200° C.
Detector temperature: 250° C.
Oven temperature: Raised from 40° C. to 230° C. at a rate of 10° C./min and held at 230° C. for 2 minutes.
Sampling volumes: 2 µL

[Results]
Tables 1-1, 1-2, 2-1 and 2-2 show the types and amounts of materials used in each Example and each Comparative Example, the desolvent treatment temperature, and the evaluation results on the hollow resin particles.

TABLE 1

|  |  | Example 1 | Example 2 | Example 3 | Example 4 | Example 5 | Example 6 | Example 7 |
|---|---|---|---|---|---|---|---|---|
| Non-crosslinkable monomer | Methacrylic acid (parts) | 5 | 5 | 5 | 5 | 5 | 5 | 5 |
|  | Methyl methacrylate (parts) | — | — | — | — | — | — | — |
| Crosslinkable monomer | Ethylene glycol dimethacrylate (parts) | 65 | 65 | 65 | 65 | 65 | 85 | 55 |
|  | Trimethylolpropane trimethacrylate (parts) | 30 | 30 | 30 | 30 | 30 | — | — |
|  | Ditrimethylolpropane tetraacrylate (parts) | — | — | — | — | — | — | 40 |
|  | Dipentaerythritol hexacrylate (parts) | — | — | — | — | — | 10 | — |
| Polymerization initiator (parts) | 2,2'-Azobis(2,4-dimethylvaleronitrile) (parts) | 3 | 3 | 3 | 3 | 3 | 3 | 3 |
|  | Potassium persulfate (parts) | — | — | — | — | — | — | — |
| Hydrocarbon solvent | Cyclohexane (boiling point 81° C.) (parts) | 400 | 600 | 1400 | — | — | 600 | 600 |
|  | n-Hexane (boiling point 68° C.) (parts) | — | — | — | 600 | — | — | — |
|  | Octane (boiling point 125° C.) (parts) | — | — | — | — | 600 | — | — |
|  | Toluene (boiling point 111° C.) (parts) | — | — | — | — | — | — | — |
| Dispersant | Surfactant (parts) | 3.0 | 3.0 | 3.0 | 3.0 | 3.0 | 3.0 | 3.0 |
|  | Ion-exchanged water (parts) | 1160 | 1620 | 3460 | 240 | 240 | 1620 | 1620 |
|  | Desolvent treatment temperature (° .C) | 75 | 75 | 75 | 65 | 95 | 75 | 75 |
|  | Volume average particle diameter (µm) | 2.8 | 2.9 | 3.1 | 2.5 | 2.6 | 3.1 | 3.0 |
|  | Shell thickness (µm) | 0.081 | 0.056 | 0.028 | 0.050 | 0.052 | 0.062 | 0.060 |
|  | Void ratio (%) | 84 | 89 | 95 | 89 | 89 | 89 | 89 |
|  | Presence or absence of collapsed particles in an aqueous medium | None | None | None | None | None | None | None |
|  | Porous particle content (%) | 0 | 0 | 0 | 0 | 0 | 0 | 0 |
|  | Particles collapsed after drying (%) | 2 | 3 | 7 | 3 | 4 | 3 | 5 |
|  | Amount of residual hydrocarbon solvent (%) | 0.09 | 0.04 | 0.02 | 0.02 | 0.14 | 0.05 | 0.05 |

|  |  | Example 8 | Example 9 | Example 10 | Example 11 | Example 12 | Example 13 |
|---|---|---|---|---|---|---|---|
| Non-crosslinkable monomer | Methacrylic acid (parts) | 5 | 5 | 2 | 5 | 5 | 5 |
|  | Methyl methacrylate (parts) | 10 | 15 | — | 15 | — | — |
| Crosslinkable monomer | Ethylene glycol dimethacrylate (parts) | 45 | — | — | 70 | 65 | 65 |
|  | Trimethylolpropane trimethacrylate (parts) | — | 80 | 96 | — | 30 | 30 |
|  | Ditrimethylolpropane tetraacrylate (parts) | 40 | — | — | — | — | — |
|  | Dipentaerythritol hexacrylate (parts) | — | — | — | 10 | — | — |
| Polymerization initiator (parts) | 2,2'-Azobis(2,4-dimethylvaleronitrile) (parts) | 3 | 3 | 3 | 3 | 3 | 3 |
|  | Potassium persulfate (parts) | — | — | — | — | — | — |
| Hydrocarbon solvent | Cyclohexane (boiling point 81° C.) (parts) | 600 | 600 | 400 | 600 | 400 | 300 |

TABLE 1-continued

|  |  |  |  |  |  |  |  |
|---|---|---|---|---|---|---|---|
|  | n-Hexane (boiling point 68° C.) (parts) | — | — | — | — | — | — |
|  | Octane (boiling point 125° C.) (parts) | — | — | — | — | — | — |
|  | Toluene (boiling point 111° C.) (parts) | — | — | — | — | 200 | 300 |
| Dispersant | Surfactant (parts) | 3.0 | 3.0 | 3.0 | 3.0 | 3.0 | 3.0 |
|  | Ion-exchanged water (parts) | 1620 | 1620 | 1160 | 1620 | 1620 | 1620 |
| Desolvent treatment temperature (° .C) |  | 75 | 75 | 75 | 75 | 95 | 95 |
| Volume average particle diameter (μm) |  | 3.0 | 2.9 | 3.4 | 3.0 | 2.9 | 3.0 |
| Shell thickness (μm) |  | 0.060 | 0.056 | 0.096 | 0.060 | 0.060 | 0.063 |
| Void ratio (%) |  | 89 | 89 | 85 | 89 | 86 | 88 |
| Presence or absence of collapsed particles in an aqueous medium |  | None | None | None | None | None | None |
| Porous particle content (%) |  | 0 | 0 | 0 | 0 | 0 | 5 |
| Particles collapsed after drying (%) |  | 11 | 12 | 2 | 15 | 4 | 5 |
| Amount of residual hydrocarbon solvent (%) |  | 0.19 | 0.25 | 0.10 | 0.29 | 0.04 | 0.03 |

TABLE 2

|  |  | Comparative Example 1 | Comparative Example 2 | Comparative Example 3 | Comparative Example 4 | Comparative Example 5 |
|---|---|---|---|---|---|---|
| Non-crosslinkable monomer | Methacrylic acid (parts) | 5 | 5 | — | 25 | 5 |
|  | Methyl methacrylate (parts) | — | — | — | — | 20 |
| Crosslinkable monomer | Ethylene glycol dimethacrylate (parts) | 65 | 65 | 100 | 75 | 75 |
|  | Trimethylolpropane trimethacrylate (parts) | 30 | 30 | — | — | — |
|  | Ditrimethylolpropane tetraacrylate (parts) | — | — | — | — | — |
|  | Dipentaerythritol hexaacrylate (parts) | — | — | — | — | — |
| Polymerization initiator (parts) | 2,2'-Azobis(2,4-dimethylvaleronitrile) (parts) | 3 | 3 | 3 | 3 | 3 |
|  | Potassium persulfate (parts) | — | — | — | — | — |
| Hydrocarbon solvent | Cyclohexane (boiling point 81° C.) (parts) | 250 | 1800 | 600 | 500 | 600 |
|  | n-Hexane (boiling point 68° C.) (parts) | — | — | — | — | — |
|  | Octane (boiling point 125° C.) (parts) | — | — | — | — | — |
|  | Toluene (boiling point 111° C.) (parts) | — | — | — | — | — |
| Dispersant | Surfactant (parts) | 3.0 | 3.0 | 3.0 | 3.0 | 3.0 |
|  | Ion-exchanged water (parts) | 810 | 4380 | 1620 | 1620 | 1610 |
| Desolvent treatment temperature (° .C) |  | 75 | 75 | Aggregated during polymerization | 75 | 75 |
| Volume average particle diameter (μm) |  | 2.7 | 3.3 |  | 2.9 | 3.3 |
| Shell thickness (μm) |  | 0.117 | 0.023 |  | 0.058 | 0.066 |
| Void ratio (%) |  | 76 | 96 |  | 88 | 89 |
| Presence or absence of collapsed particles in an aqueous medium |  | None | Exist |  | Exist | Exist |
| Porous particle content (%) |  | 0 | 0 |  | 0 | 0 |
| Particles collapsed after drying (%) |  | 37 | 100 |  | 100 | 100 |
| Amount of residual hydrocarbon solvent (%) |  | 13.0 | 0.01 |  | 21.0 | 26.0 |

|  |  | Comparative Example 6 | Comparative Example 7 | Comparative Example 8 | Comparative Example 9 |
|---|---|---|---|---|---|
| Non-crosslinkable | Methacrylic acid (parts) | 5 | 5 | 5 | 5 |

TABLE 2-continued

| | | | | | |
|---|---|---|---|---|---|
| monomer | Methyl methacrylate (parts) | — | — | — | — |
| Crosslinkable monomer | Ethylene glycol dimethacrylate (parts) | 95 | 65 | 65 | 65 |
| | Trimethylolpropane trimethacrylate (parts) | — | 30 | 30 | 30 |
| | Ditrimethylolpropane tetraacrylate (parts) | — | — | — | — |
| | Dipentaerythritol hexaacrylate (parts) | — | — | — | — |
| Polymerization initiator (parts) | 2,2'-Azobis(2,4-dimethylvaleronitrile) (parts) | 3 | — | 3 | 3 |
| | Potassium persulfate (parts) | — | 3 | — | — |
| Hydrocarbon solvent | Cyclohexane (boiling point 81° C.) (parts) | 600 | 600 | — | 200 |
| | n-Hexane (boiling point 68° C.) (parts) | — | — | — | — |
| | Octane (boiling point 125° C.) (parts) | — | — | — | — |
| | Toluene (boiling point 111° C.) (parts) | — | — | 600 | 400 |
| Dispersant | Surfactant (parts) | 3.0 | 3.0 | 3.0 | 3.0 |
| Ion-exchanged water (parts) | | 1620 | 1620 | 1620 | 1620 |
| Desolvent treatment temperature (° .C) | | 75 | 75 | 95 | 95 |
| Volume average particle diameter (μm) | | 2.9 | Mixed with dense real particles with a diameter of about 100 nm | 3.5 | 3.3 |
| Shell thickness (μm) | | 0.056 | | — | 0.073 |
| Void ratio (%) | | 89 | | — | 87 |
| Presence or absence of collapsed particles in an aqueous medium | | None | | None | None |
| Porous particle content (%) | | 0 | | 100 | 34 |
| Particles collapsed after drying (%) | | 51 | | — | — |
| Amount of residual hydrocarbon solvent (%) | | 0.10 | | 0.20 | 0.15 |

[Consideration]

Hereinafter, with reference to Tables 1-1, 1-2, 2-1 and 2-2, evaluation results of each Example and each Comparative Example will be examined.

In Comparative Example 1, since the content of the hydrocarbon solvent in the mixture liquid was insufficient, the obtained hollow resin particles had a low void ratio, a large residual hydrocarbon solvent amount, and a tendency to collapse after drying.

In Comparative Example 2, since the content of the hydrocarbon solvent in the mixture liquid was too large, the obtained hollow resin particles tend to collapse both in the aqueous medium and after drying.

In Comparative Example 3, since the content of the crosslinkable monomer in the mixture liquid was too large, the resin was aggregated in the polymerization step, so that hollow resin particles could not be obtained.

In Comparative Examples 4 and 5, since the content of crosslinkable monomers in the mixture liquid was insufficient and the content of tri- or higher functional crosslinkable monomer was insufficient, the obtained hollow resin particles had a large residual hydrocarbon solvent amount and were those in which collapse tends to occur both in an aqueous medium and after drying.

In Comparative Example 6, since the content of tri- or higher functional crosslinkable monomer in the mixture liquid was insufficient, the obtained hollow resin particles were those in which collapse tends to occur after drying.

In Comparative Examples 4 to 6, it is presumed that the obtained hollow resin particles tend to collapse, since the communication hole was not sufficiently formed in the shell of the hollow resin particles due to the insufficient content of the tri- or higher functional crosslinkable monomer.

In Comparative Example 7, since a water-soluble polymerization initiator was used as a polymerization initiator, many dense real particles filled with a resin inside and having a particle diameter of about 100 nm were generated.

In Comparative Example 8, since hydrocarbon solvent containing no saturated hydrocarbon solvent was used as a hydrocarbon solvent, hollow resin particles having only one hollow portion were not obtained, and porous particles were generated. Therefore, the thickness of the shell and the void ratio could not be measured.

In Comparative Example 9, since a hydrocarbon solvent, containing a saturated hydrocarbon solvent but the ratio of the saturated hydrocarbon solvent was less than 50% by mass, was used as a hydrocarbon solvent, hollow resin particles having only one hollow portion were also generated, but a large number of porous particles were generated.

Note that, in Comparative Examples 8 and 9, the ratio of particles collapsed after drying was not measured.

On the other hand, in Examples 1 to 13, a hydrocarbon solvent having a ratio of a saturated hydrocarbon solvent, of 50% by mass or more was used as a hydrocarbon solvent, and an oil-soluble polymerization initiator was used as a polymerization initiator, and with respect to 100 parts by mass of the total mass of the polymerizable monomer, the total content of the crosslinkable monomer in the mixture liquid was from 80 parts by mass to 98 parts by mass, the content of the tri- or higher functional crosslinkable monomer was from 10 parts by mass to 98 parts by mass, and the content of the hydrocarbon solvent was from 300 parts by mass to 1500 parts by mass, so that the obtained hollow resin particles had a high void ratio, a volume average particle diameter of 1 μm or more, and a reduced residual hydrocarbon solvent amount, and collapse hardly occurred in both of the aqueous medium and after drying. In Examples 1 to 13, the generation of dense particles with a relatively small particle diameter was suppressed, and the generation of porous particles was also suppressed. Among them, Examples 1 to 7, 10, 12 and 13, in which the content of the crosslinkable monomer was set to be more than 85 parts by mass per 100 parts by mass of the total mass of the polymerizable monomer, the obtained hollow resin particles were less likely to collapse, and the residual hydrocarbon solvent amount was further reduced.

REFERENCE SYMBOLS LIST

1. Aqueous medium
2. Low polarity material
3. Suspension stabilizer
4. Monomer composition
4a. Monomer dispersed in aqueous medium
5. Oil-soluble polymerization initiator
6. Shell
7. Hydrocarbon solvent
8. Hollow portion
10. Micelle
20. Precursor particle
51. Aqueous medium
52. Surfactant
53. Monomer composition
53a. Monomer dissolved out to aqueous medium
54. water-soluble polymerization initiator
60. Micelle
60a. Micelle precursor
100. Hollow resin particle

The invention claimed is:

1. A method for producing hollow resin particles, the method comprising:
    a mixture liquid preparation step comprising preparing a mixture liquid which contains a polymerizable monomer containing a non-crosslinkable monomer and a crosslinkable monomer, a hydrocarbon solvent, a polymerization initiator and an aqueous medium,
    a suspension preparation step comprising, by suspending the mixture liquid, preparing a suspension in which polymerizable monomer droplets including the hydrocarbon solvent are dispersed in the aqueous medium,
    a polymerization step comprising, by a polymerization reaction of the suspension, preparing a precursor composition containing a precursor particle having a hollow portion in which the hydrocarbon solvent is included, and
    a solvent removal step comprising removing the hydrocarbon solvent included in the precursor particle;
    wherein a content of the saturated hydrocarbon solvent is 50% by mass or more, with respect to 100% by mass of a total amount of the hydrocarbon solvent;
    wherein the polymerization initiator is an oil-soluble polymerization initiator; and
    wherein the crosslinkable monomer contains a tri- or higher functional crosslinkable monomer having three or more polymerizable functional groups, and with respect to 100 parts by mass of a total amount of the polymerizable monomer in the mixture liquid, a total content of the crosslinkable monomer is from 80 parts by mass to 98 parts by mass, a content of the tri- or higher functional crosslinkable monomer is from 10 parts by mass to 98 parts by mass, and a content of the hydrocarbon solvent is from 300 parts by mass to 1500 parts by mass.

2. The method for producing hollow resin particles according to claim 1, wherein a volume average particle diameter of the hollow resin particles is from 1 μm to 20 μm.

3. The method for producing hollow resin particles according to claim 1, wherein the polymerizable monomer in the mixture liquid contains from 1 part by mass to 10 parts by mass of a carboxyl group-containing monomer, with respect to 100 parts by mass of a total amount of the polymerizable monomer.

4. The method for producing hollow resin particles according to claim 1, wherein the hydrocarbon solvent has 4 to 7 carbon atoms.

5. The method for producing hollow resin particles according to claim 1, wherein the solvent removal step is a step comprising removing the hydrocarbon solvent included in the precursor particle in the precursor composition by bubbling an inert gas into the precursor composition at a temperature higher than or equal to a temperature subtracted from the boiling point of the hydrocarbon solvent by 35° C.

* * * * *